United States Patent [19]

Salda et al.

[11] Patent Number: 4,624,571

[45] Date of Patent: Nov. 25, 1986

[54] APPARATUS FOR DETECTING THE COLORING OF MOVING FLAT-SHAPED BODIES

[75] Inventors: Luciano Salda, Vignola; Daniele Pasqui; Gianni Mantovani, both of Bologna, all of Italy

[73] Assignee: M.S. Sistemi Automatici S.r.l., Vignola, Italy

[21] Appl. No.: 650,036

[22] Filed: Sep. 13, 1984

[30] Foreign Application Priority Data

Sep. 21, 1983 [IT] Italy ................................ 12625 A/83

[51] Int. Cl.$^4$ ................................................. G01J 3/50
[52] U.S. Cl. ..................................... 356/406; 356/407; 356/425
[58] Field of Search ............... 356/406, 407, 416, 425; 209/580, 582, 581

[56] References Cited

U.S. PATENT DOCUMENTS

| | | | |
|---|---|---|---|
| 3,867,039 | 2/1975 | Nelson | 209/582 X |
| 4,088,227 | 5/1978 | Lockett | 209/581 |
| 4,278,538 | 7/1981 | Lawrence et al. | 209/581 X |
| 4,281,933 | 8/1981 | Houston et al. | 209/582 X |
| 4,476,982 | 10/1984 | Paddock et al. | 209/582 |

OTHER PUBLICATIONS

Lewis et al, American Dyestuff Reporter, Oct. 9, 1967, pp. 37-40.

*Primary Examiner*—F. L. Evans
*Attorney, Agent, or Firm*—Pollock, Vande Sande & Priddy

[57] ABSTRACT

Apparatus for detecting the coloring of moving tiles for the purpose of dividing their flow into a plurality of flows as a function of the quality of their color. The apparatus detects the color of successive portions of the moving tile and breaks down the detected light spectrum into the three primary colors according to the trichromatic theory. The intensity of each primary color is converted into an electric function by a bank of photoelectric sensors, and this function is processed and compared in a microprocessor with coded signals corresponding to the ideal or optimum coloring that the detected tile should present. The microprocessor emits the signals for automating the division of the flow of scanned tiles into a plurality of flows differing in the quality of the coloring of said tiles.

4 Claims, 1 Drawing Figure

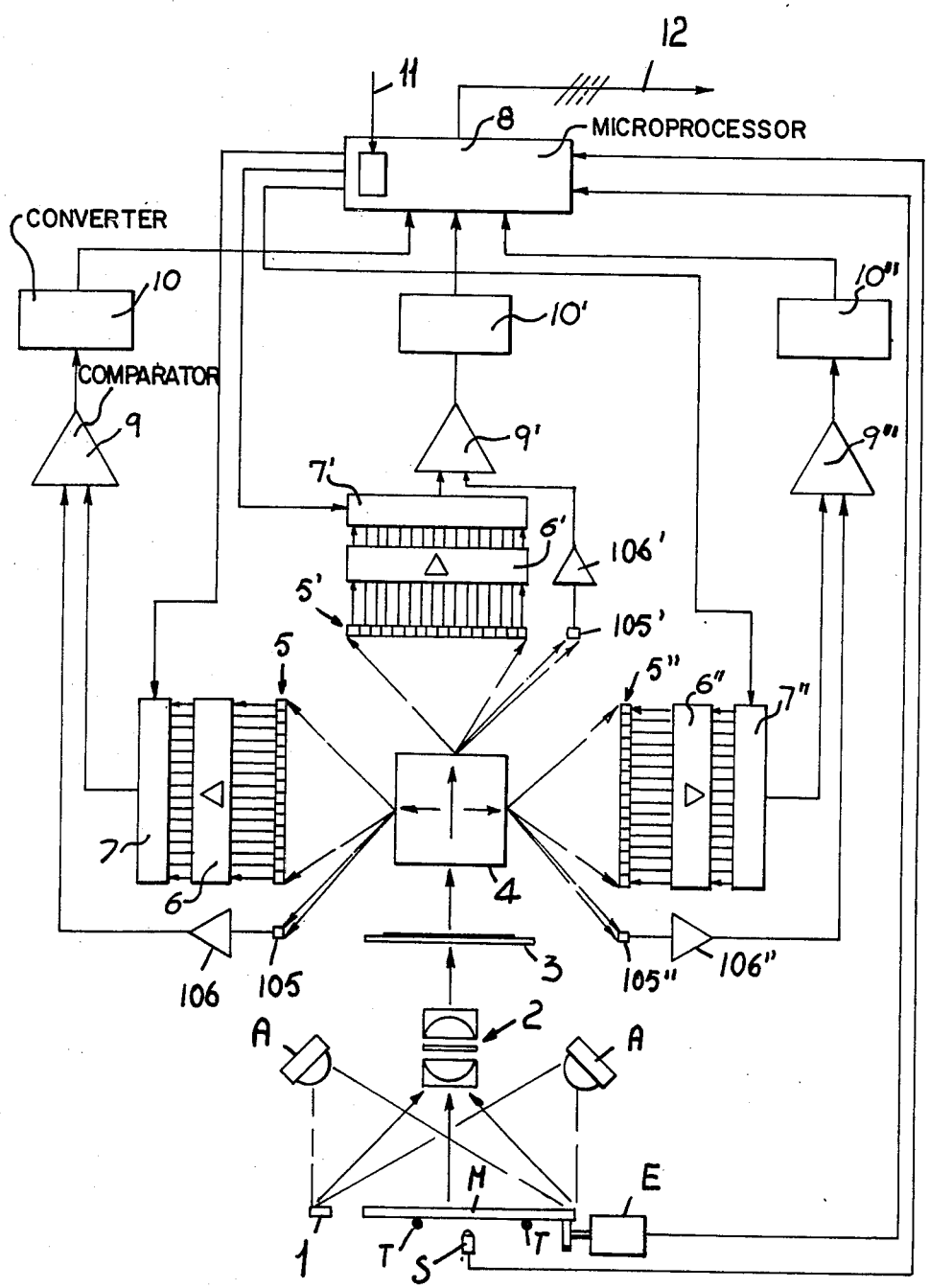

APPARATUS FOR DETECTING THE COLORING OF MOVING FLAT-SHAPED BODIES

SUMMARY OF THE INVENTION

This invention relates to an apparatus adapted to detect the coloring, even if of composite formation, of moving flat-shaped bodies, and is adapted to process electric signals that will vary in case of any variation between the detected coloring and a predetermined ideal coloring. In a possible industrial application, the present apparatus could be used to divide a flow of ceramic tiles into a plurality of flows differing in the quality of their coloring. The apparatus of said tiles. The apparatus is distinguished by its simpler construction and greater dependability from any known apparatus having the same function.

BRIEF DESCRIPTION OF THE DRAWING

These and other features of the apparatus and the advantages resulting therefrom will be apparent from the following description of a preferred embodiment thereof, shown by way of example in the single sheet of drawing which shows a block diagram of the apparatus of the invention.

DESCRIPTION OF THE PREFERRED EMBODIMENT

In this drawing, it will be seen that the tile M to be scanned is translated horizontally by a conveyor T on a rectilinear path of travel so that the surface thereof to be scanned faces upwards and is entirely unobstructed, while one or more fixed light sources A illuminate it. The movement of the tile is detected by an encoder E which issues electric pulses whose cadence is proportional to the speed of advance of said tile and is proportional also to the detecting power of the apparatus (see below). A fixed sensor S detects the front side and the rear side of the tile M. Beside the tile, and co-planar therewith at a suitable distance therefrom, there is a stationary flat-shaped body 1 having a predetermined color, e.g. white, which is illuminated by the same light sources A that illuminate the tile. The body 1 enters the field of vision of the apparatus and is constantly detected together with the portion of the tile that is scanned successively by said apparatus. The function of the body 1 will be further discussed in the following description.

The apparatus of the invention comprises a lens 2 of suitable characteristics located above the assembly M-1 to be scanned and adapted to reduce the image of said assembly to such a size as to permit the detection thereof by a bank of photoelectric sensors to be described below. Downstream of the lens 2, which is carried by a suitable supporting stationary and closed structure (not shown) there is provided a light filter 3 intended to balance the light spectrum of the optical information issued from said lens, in accordance with the colorimetric response of the human eye. The light spectrum of the image from the filter 3 is spread out or broken down by known separator means 4 into the three primary colors according to the trichromatic theory, namely red, green and blue. The separator unit 4 is formed, for example, by filters and dichroic or semi-transparent mirrors or by a so-called chromatic prism. The light informations concerning the three primary colors, issued from the unit 4, reach respective banks of photoelectric sensors 5-5'-5'', formed preferably by solar cells, of suitable size and in a suitable number, arranged in succession to each other. Since the reduction power of the optical assembly used in the apparatus is about 10 to 1, and since it is assumed that the maximum width of the tiles to be scanned is up to around 400 mm, each bank of photoelectric sensors is formed by sixteen solar cells each having the contour of a square which is 2.5 mm on each side. Beside each bank 5-5'-5'', suitably spaced therefrom and aligned therewith, there is provided at least one further solar cell 105-105'-105'' which is responsive to the light information, likewise converted into primary color, concerning the stationary body 1. By this arrangement, the construction of the apparatus is simplified because it avoids the introduction therein of any excessively detailed and useless information concerning the color of the tiles to be examined.

The low electrical levels emitted by the various sensors forming said photoelectric banks are processed by respective amplifiers 6-106, 6'-106', 6''-106''. The outputs of the banks of amplifiers 6-6'-6'' are connected to the inputs of multiplexer units 7-7'-7'' which receive clock signals, with the same cadence as the signals issued by the encoder E, from a microprocessor 8, to be discussed below, having operatively connected thereto the devices E and S mentioned in the preamble of this specification. The outputs from the units 7-7'-7'' are directed to one of the inputs of respective comparators 9-9'-9'', the second inputs of which are connected to respective amplifiers 106-106'-106''. The light information concerning portions of tile which are about 2.5 cm wide, broken down into three primary colors as stated above, therefore, is compared cyclically with the light information, also broken down into three primary colors, concerning the stationary body 1. The signal from the comparators 9-9'-9'' is the result of the division of the input signals, the dividend being the signal from the amplifiers 106-106'-106'' and the divisor being the signal from the multiplexers 7-7'-7'' and representing the output signal from each of the bank amplifiers 6-6'-6''. It is now apparent that if the electronic components discussed above were subject to thermal drift, or if the light intensity of the illuminating sources A were subject to variation, the signal from the comparator 9-9'-9'' would not be affected by these variables.

The signals issued from the comparators are converted by blocks 10-10'-10'' into digital signals and are sent out to the microprocessor 8 where they are processed and are compared with electric signals corresponding to the ideal colors of the various detected regions of a tile, said signals being previously introduced into the unit 8, through a programmation input 11. As a function of the color differences detected by the microprocessor 8, the latter will emit, on one or more paths 12, signals which may be used to selectively cause the actuation of servo-controls capable of dividing the flow of the detected tiles M into a plurality of flows differing in the quality of the color of said tiles. The programmation information may be introduced into the microprocessor by means of any suitable conventional system. Means which will be easily conceivable by those skilled in the art may be provided, for example, to permit the programmation information to be introduced into the microprocessor at the beginning of each operative cycle, by actuating a suitable switch and by passing a "first selection" tile below the lens 2, so as to memorize the information issued from the A/D convertors 10-10'-10".

The components of the apparatus may be assembled in any conventional manner, e.g. according to the technique used with color TV cameras.

We claim:

1. An apparatus for detecting the coloring, even of composite formation, of a moving object, such as tiles, and comparing the detected information with coded information corresponding to an ideal coloring of said object by processing different signals dependent upon the detected differences, wherein said signals may be used for dividing a flow of said objects into different flows as a function of the quality of their color, said apparatus comprising the following components:

(a) a lens (2) directed toward an object to be scanned, said object being illuminated by light sources (A) and translated in proximity to said lens;

(b) a light filter (3) located downstream of said lens to balance a detected light spectrum according to the colorimetric response of the human eye;

(c) a separator unit (4), comprising means to spread out light information issued from said filter into primary colors;

(d) a stationary flat-shaped reference body (1) of a pre-established color, arranged beside an object to be scanned, co-planar therewith and suitably spaced therefrom so as to be in the field of vision of said lens, said body also being illuminated by said light sources (A);

(e) three banks of photoelectric sensors (5-5'-5") each of which is reached by monochromatic light information issued from said separator unit (4), each of said banks consisting of a plurality of solar cells arranged side by side and aligned to form a rectilinear arrangement, at least one further respective solar cell (105-105'-150") reached by said monochromatic light information concerning said reference body (1) being provided at a proper distance from said arrangement and for each arrangement;

(f) means (6-106, 6'-106', 6"-106") for amplifying the low electrical levels from said photoelectric sensors, so as to adapt them for processing by successive processing means;

(g) means (9-9'-9" and 7-7'-7") for comparing the electric signals from said photoelectric sensors which are responsive to the light information from said object to be scanned, with the electric signal from said sensor reached by the light information from said reference body (1), the arrangement being such that the electric output signal from said comparing means may vary only due to an actual variation of the color of said object being scanned and not due to thermal drifts in the electronic components of the reading unit to variations in the illumination level of said object;

(h) means (10-10'-10") for converting an analogic output signal from said comparing means into a corresponding digital signal;

(i) a microprocessor (8) having memorized and coded therein the information concerning the coloring to be presented by said object to be scanned and which is compared with the processed information from said converters, the arrangement being such that, depending upon the detected differences, said microprocessor will emit different electric signals that may be used to control the division of the flow of the objects being scanned as a function of the quality of their coloring; and (j) means (S) for detecting the beginning and the end of each object to be scanned, and means (E) for detecting the speed of advance of said object and which emits electrical signals with a cadence depending upon said speed, the arrangement being such that the signals from said means will reach said microprocessor (8) to activate it cyclically and to synchronize the comparison of the coded information with the information progressively reaching said microprocessor through said converters.

2. An apparatus according to claim 1, wherein the system (2, 3, 4) operates with a ratio of about ten to one.

3. An apparatus according to claim 1, wherein the solar cells constituting each bank of photoelectric sensors (5-5'-5") have a square periphery of 2.5 mm on each side, are sixteen in number and are located side by side in a rectilinear arrangement, at least one solar cell (105-105'-105") having the dimensions specified above being provided at a suitable distance from said assembly and aligned therewith, for detecting the light information from said reference body (1).

4. An apparatus according to claim 1, wherein the coded information concerning the ideal coloring of said object being scanned is introduced into said microprocessor (8) at the beginning of each operative cycle, one of said objects to be scanned having a coloring which is deemed an ideal coloring being passed below said lens (2) and the information from said converters (10-10'-10") being memorized to form said operation program of the microprocessor (8).

* * * * *